H. SOGGS.
Butter Worker.
No. 25,145. Patented Aug. 16, 1859.
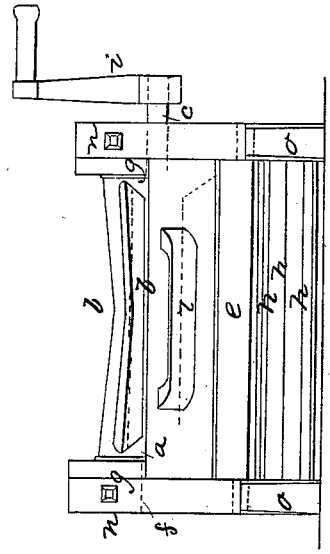
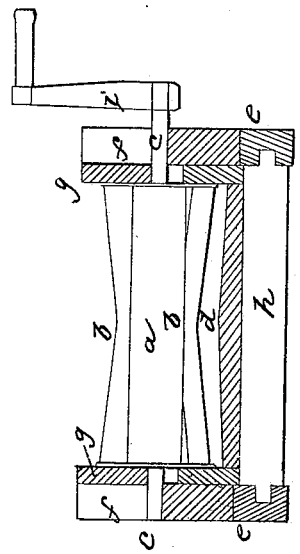
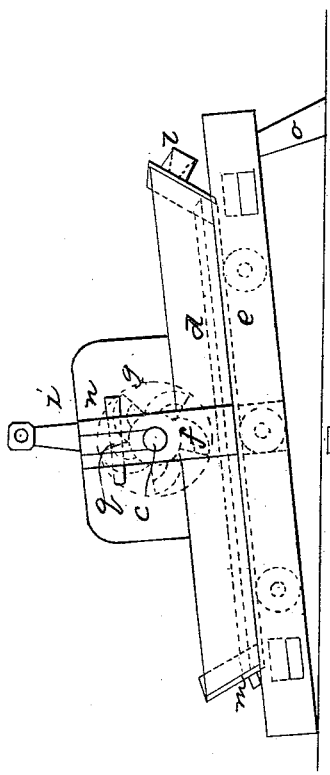
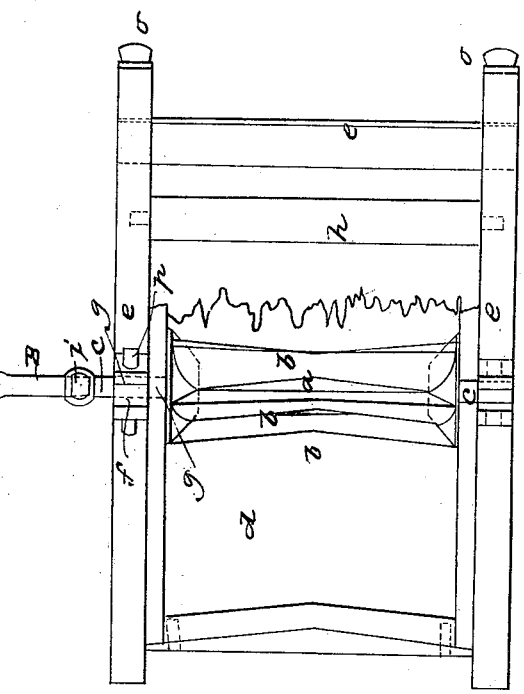
Witnesses
John B Fenton
N. B. ___
Inventor
Henry Soggs

UNITED STATES PATENT OFFICE.

HENRY SOGGS, OF COLUMBUS, PENNSYLVANIA.

BUTTER-WORKER.

Specification of Letters Patent No. 25,145, dated August 16, 1859.

*To all whom it may concern:*

Be it known that I, HENRY SOGGS, of Columbus, in the county of Warren and State of Pennsylvania, have invented a new and Improved Machine for Working Butter; and I do hereby declare that the following is a full and exact description thereof, reference being had to the accompanying drawings and to the letters of reference marked thereon.

The nature of my invention consists of a cylinder furnished with ribs of peculiar shape—which cylinder and ribs are made to revolve (by the crank as shown on plan) in connection with a tray or receiver of peculiar shape—with a convex bottom adapted to the concave ribs on cylinder, the tray being set on an inclined plane of rollers. The butter being placed in the tub the crank is turned and the cylinder with its concave ribs coming in contact with said butter carries the tray in the direction of the revolving cylinder—and the milk and all superfluous matter being extracted from the butter the same follow the channels made by the receding ribs—as cross channels—and leading into the side channels made by the cylinder at its extremes flow down the inclined plane to the openings or discharge channels, when the same escape, leaving the butter pure and free from all watery or injurious mixture. The gentle action of the ribs when coming in connection with the butter is such as not to break the grain of the butter.

To enable others skilled in the art to make and use my invention, I will proceed to describe its construction and operation.

First a frame ($e$) is furnished with rollers ($h$) as shown on plan and is raised at one end by the two feet ($o$) so as to form an inclined plane. The tray ($d$) is made of a suitable length and of a width equal to the width of the frame in the clear allowing for room to play back and forward with ease. The tray is also of a convex surface at its bottom and ends.

($a$) is a cylinder furnished with a suitable number of ribs ($b$). The ribs ($b$) are made by two cones intersecting each other at some certain distance from their apex having one common center—the same being quartered longitudinally. The cylinder $a$ is so formed that the diameter of the ends is such as to be at its surface farther from its center than any part of the ribs when the same is fastened to the cylinder. The ends of the cylinder are made to form an angle at the intersection with the cylinder of more than 90 degrees or about 120°.

($f$) is an upright securely fastened to the frame ($e$) and through which the shaft ($c$) of the cylinder $a$ passes.

($g$) is a side board placed against the upright ($f$) and of a width equal to the width of the sides of the tray ($d$) and so fastened to the upright as to allow the tray to pass freely along back and forward and yet firm enough to steady said tray while in motion.

($n$) is a pin passing through the upright ($f$) and a flange ($q$) which flange ($q$) is firmly attached to the side-board ($g$) and fitted to its recess so as to cover and steady the shaft ($c$).

($l$) is a handle attached to the tray ($d$) by which the tray is moved back and forward.

($m$) are pins or openings furnished with stoppers placed in each end or corner of the lower end of the tray to allow of the milk and watery substances of the butter to escape.

($i$) is a crank firmly attached to the cylinder ($a$) by the shaft ($c$) and from which the cylinder receives its motion.

Having described the separate parts of the machine I will now describe its operation.

When the machine is to be used, the tray is drawn up the inclined plane—and the butter is placed in the upper end. The crank ($i$) in its position on the plan being turned toward the legs ($o$) which causes the cylinder and attached ribs to revolve, carrying the tray down the inclined plane. By reversing the motion of the crank the tray is carried back and by repeating the operation the milk and all watery substances flow through the channels to the escape openings ($m$). The butter is salted previously to being worked, and when the brine flows clear the butter is worked sufficient. The next process is to roll the butter, which is done by moving the tray in an opposite direction to the motion of the revolving shaft.

I do not claim the working of concave and convex surfaces in combination in the broad sense of the word, but

What I claim and wish to secure by Letters Patent is—

The tray (*d*) with convex bottom and ends set on an inclined plane of rollers working in combination with the cylinder (*a*) and ribs (*b*) for the purpose of working the milk and superfluous matter from the butter at the same time leaving channels in said butter through which the milk, &c., may escape.

HENRY SOGGS.

Witnesses:
 JOHN B. BENTON,
 H. B. BURT.